United States Patent [19]

Foroglou

[11] 4,089,928

[45] May 16, 1978

[54] METHOD FOR INCREASING THE $MnO_2$ CONTENT OF NATURAL MANGANESE DIOXIDE ORE

[75] Inventor: Zafiris Foroglou, Athens, Greece

[73] Assignee: Eleusis Bauxite Mines-Mining Industrial and Shipping Inc., Athens, Greece

[21] Appl. No.: 783,023

[22] Filed: Mar. 30, 1977

[30] Foreign Application Priority Data

Mar. 30, 1976 Greece .................................. 50428

[51] Int. Cl.² .............................................. C01G 45/02
[52] U.S. Cl. ...................................... 423/49; 75/1 R; 75/2; 423/1
[58] Field of Search ........................... 423/1, 49, 605; 429/224; 75/1 R, 2

[56] References Cited

U.S. PATENT DOCUMENTS

| | | | |
|---|---|---|---|
| 1,143,828 | 6/1915 | Isherwood | 423/49 |
| 1,448,110 | 3/1923 | Olameta | 423/49 |
| 1,959,448 | 5/1934 | Staufer et al. | 423/1 |
| 2,667,405 | 1/1954 | Muller et al. | 423/49 |
| 3,025,131 | 3/1962 | Lerner | 423/1 |
| 3,780,159 | 12/1973 | Welsh | 423/49 |
| 3,864,118 | 2/1975 | Sehumacher et al. | 423/49 |

*Primary Examiner*—Herbert T. Carter
*Attorney, Agent, or Firm*—Watson, Cole, Grindle & Watson

[57] ABSTRACT

An active natural manganese dioxide mineral for use in dry battery cells is produced from a natural manganese dioxide ore by reacting the ore or a preconcentrate thereof with a solution of an acid. The acid reacts with the carbonates, such as calcium carbonate, to produce water-soluble salts which are then washed away. The resultant mineral can have an $MnO_2$ content of 80% by weight or more.

9 Claims, No Drawings

METHOD FOR INCREASING THE MnO₂ CONTENT OF NATURAL MANGANESE DIOXIDE ORE

BACKGROUND OF THE INVENTION

Manganese dioxide ($MnO_2$) in an important raw material which is used extensively in the production of dry batteries due to the fact that when used in making the battery cells it can greatly effect the efficiency of the cell under certain discharging conditions as determined by the quantity of electric energy produced and the ability of the cell to supply electric current at all. The various types of manganese oxides which the battery manufacturers currently use in making batteries of the so-called Leclanché type, due to their oxidizing properties as depolarizers, are distinguishable according to their origin as follows:

(a) Natural manganese dioxides which are extracted from minerals by dressing wherein removal of some of the minor constituents results in an increase in the manganese dioxide percentage;
(b) Natural inactive manganese oxides which have been subjected to chemical activation;
(c) Manganese dioxides which have been produced electrolytically; and
(d) Synthetic manganese oxides.

The natural manganese dioxides of (a) are characterized as being either "active" or "inactive" according to their suitability as depolarizers in the manufacture of dry cells. Natural manganese dioxides occur in various forms and types and are generally dressed up to 75–80% by weight of $MnO_2$, based on the requirements of dry battery manufacturers, and the final product is introduced into commerce in powdered form having a grain size of less than 0.15 mm.

Upgrading of such powdered $MnO_2$ is carried out by crushing, sizing and separation by gravity and based on the differences in bulk density. The concentrate almost always includes foreign matter, the percentage of which fluctuates between 20 and 30% by weight, due to the earth formations found adjacent to the deposits of the mineral. Such foreign matter includes compounds which are considered to be harmless (inert), such as silicates, or other compounds which are in fact detrimental (in terms of their influence of the discharging capacity of the dry cells which utilize the $MnO_2$), such as carbonates or the soluble compounds of heavy metals (soluble in electrolyte solution).

In nature there are found active manganese dioxide ores which include exceptionally high percentages of carbonates, which carbonates are so finely distributed in the mass of the manganese dioxide that upgrading by mechanical methods is impossible, or else in such cases where mechanical methods are relatively successful, further dressing is nevertheless completely unprofitable because of the low mineral recovery.

It is thus an object of the present invention to provide a method for the production of a mineral concentrate which is high in $MnO_2$ and which shows improved electrochemical properties by suitably treating in ore which is rich in carbonates of the above-discussed type or by suitably treating a pre-concentrate of such an ore.

SUMMARY OF THE PRESENT INVENTION

According to the present invention the ore is treated with an acid in accordance with the following reaction:

$$CaCO_3 + 2H^+ \rightarrow Ca^{++} + H_2O + CO_2$$

The foregoing treatment results in the following advantages:

(1) an increase in the recovery of the mineral;
(2) production of a concentrate having an increased $MnO_2$ percentage, i.e. of approximately 80% by weight or more, by treating ores which by prior art processes could not be profitably processed; at the same time reducing the $CO_2$ content of the product to lower than 1%,
(3) production of a product mineral which shows superior electro-chemical properties due to acid treatment of the ore to obtain a product having an increased $MnO_2$ percentage; and
(4) production of a product mineral which provides an improved stability of the heavy metal compounds in dry battery cells against the electrolyte solution (Stability Test), depending on the type of ore treated.

The nature of the acid used in the treatment according to the above-noted reaction is not of particular importance as long as it does not have a reducing action on the manganese dioxide, and as long as the salts formed during the reaction are water soluble. The concentration of the acid used can be chosen within broad limits. Very good results are obtainable when the particle size of the ore is less than 1 mm and when the treatment acid is a 4 to 7% and, preferably a 4 to 6%, water solution of nitric acid, or a 2 to 4%, and preferably a 2.5 to 4.0%, water solution of hydrochloric acid. The reaction time is about 30 minutes. It should be noted, however, that the particle size of the composition treated need not be less than 1 mm in order to obtain satisfactory results.

The reaction can be conducted at ambient temperatures and in open vessels, and the material may be stirred or mechanically agitated in a revolving drum. The product, after the reaction is complete, is washed three or four times, e.g. with water, so that the salts and the residual acidity is removed, i.e., neutralization is achieved.

The inventive method will now be further explained and understood by means of the following example.

EXAMPLE

By means of mechanical dressing, an ore containing $MnO_2$ and various foreign material was concentrated to containing 75% $MnO_2$ (with a mineral recovery of 20%), and the product was then extracted. The same ore, dressed at first by mechanical methods with a 34.5% recovery, produced a pre-concentrate with 72% $MnO_2$. Subsequent to an acid treatment of the noted preconcentrate, a final product was obtained having about 80% $MnO_2$ with a 29.3% mineral recovery, this recovery taking into consideration the weight losses during the acid treatment amounting to 15% of the feed.

When nitric acid was used for the treatment, 73.4 kgs of a 54% acid was required per unit of carbon dioxide per ton of treated ore. When hydrochloric acid was used for the treatment, 76.9 kgs of a 32% acid was required per unit of carbon dioxide per ton of treated ore. In both cases the acid was necessarily diluted to 10 times its volume in water.

The following Table represents the chemical analysis of the products at the various stages of the two treatments which took place, these products (active natural manganese dioxide) having improved chemical compositions and electrochemical properties

| Chemical Ingredient | Weight Percent of Ingredient in Preconcentrate before acid treatment | Weight Percent of Ingredient in product acid treatment with $HNO_3$ | Weight Percent of Ingredient in Product after acid treatment with HCl |
|---|---|---|---|
| $MnO_2$ | 71.47 | 80.15 | 81.20 |
| Insoluble Compounds | 5.73 | 5.87 | 5.68 |
| Pb | 0.79 | 0.67 | 0.75 |
| Cu | 0.037 | 0.036 | 0.038 |
| Zn | 0.50 | 0.50 | 0.52 |
| Fe | 0.96 | 1.14 | 1.12 |
| CaO | 8.17 | 2.87 | 2.63 |
| $CO_2$ | 4.85 | 1.11 | 0.90 |
| Mild Discharge[1] | 72.52 MAh/gr[2] | 80.89 | 77.25 |
| Hard Discharge[3] | 11.88 MAh/gr[2] | 14.76 | 15.57 |

[1]Low current discharge schedule: discharge made with 12.75 mA/0.35 gr. ore with the cut-off voltage of 1.00 volt
[2]Milliamperes Hour/per gram of ore
[3]High current demand: discharge made with 61.25 mA/0.35 gr. ore with the cut-off voltage of 1.20 volts

I claim:

1. A method for the production of active natural manganese dioxide mineral having a high percentage of $MnO_2$ and a low percentage of carbonates, which mineral provides improved electrochemical properties when employed in dry battery cells such as an increased delivery of current per unit of mass and improved stability of the employed heavy metals against solution in the electrolyte, the method comprising
    (1) reacting an ore which contains natural manganese dioxide and significant amounts of carbonates with a solution of 2-4% hydrochloric acid, the reaction being conducted at ambient temperature and in an open vessel;
    (2) allowing the reaction to proceed to completion, such that the carbonates react with the acid so as to produce water-soluble salts; and
    (3) washing the reaction product in order to remove the water-soluble salts and thereby obtain a solid mineral product which is enriched in $MnO_2$.

2. The method of claim 1, wherein prior to step 1 the ore which contains natural manganese dioxide is pretreated in order to produce an ore in preconcentrate form.

3. The method of claim 2, wherein said pretreatment comprises mechanical dressing of the ore.

4. The method of claim 3, wherein the mechanical dressing of said ore comprises crushing said ore, sizing the crushed ore, and separating the ore into fractions differing in bulk density.

5. The method of claim 2, wherein said pretreatment comprises subjecting the ore to flotation.

6. The method of claim 1, wherein in step (3) the washing is conducted with water.

7. The method of claim 1, wherein the solid mineral product obtained in step (3) has a $MnO_2$ content of at least 80% by weight.

8. The method of claim 7, wherein the ore treated in step (1) contains about 72% $MnO_2$ by weight.

9. The method of claim 1, wherein the reaction is allowed to proceed for about 30 minutes.

* * * * *